May 27, 1952 T. BLOMÉN 2,598,032
WET SEPARATOR FOR PURIFYING A PARTICLE LADEN GAS CURRENT
Filed June 22, 1949 3 Sheets-Sheet 1
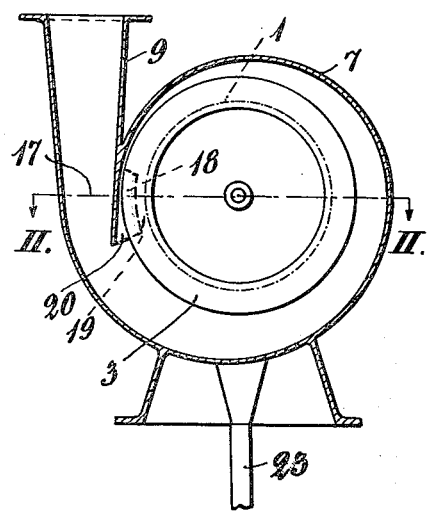
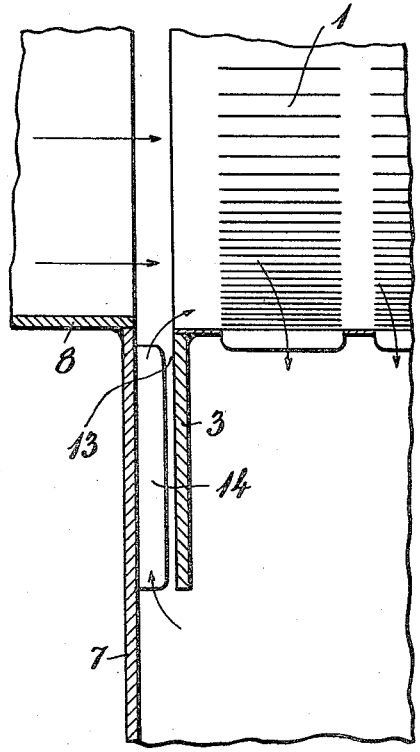
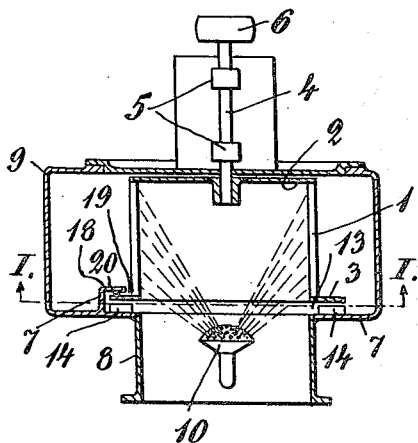
INVENTOR
TORSTEN BLOMÉN
BY
ATTORNEY May 27, 1952 T. BLOMÉN 2,598,032
WET SEPARATOR FOR PURIFYING A PARTICLE LADEN GAS CURRENT
Filed June 22, 1949 3 Sheets-Sheet 2
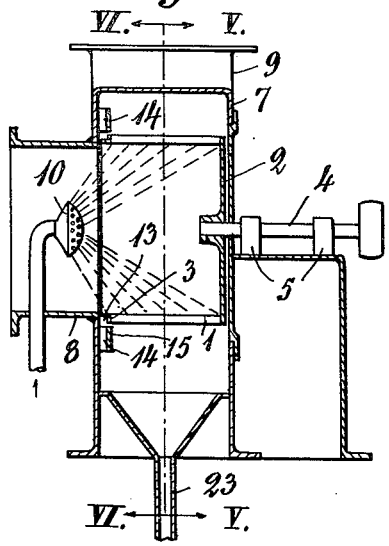
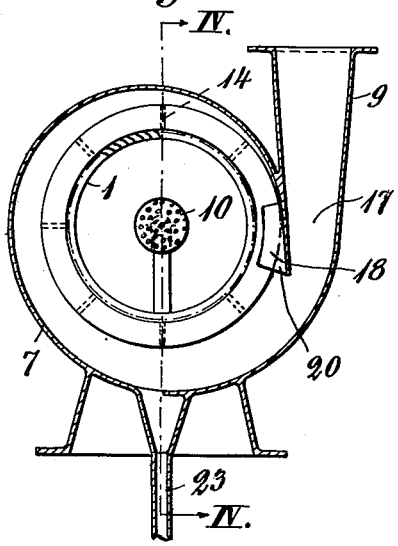
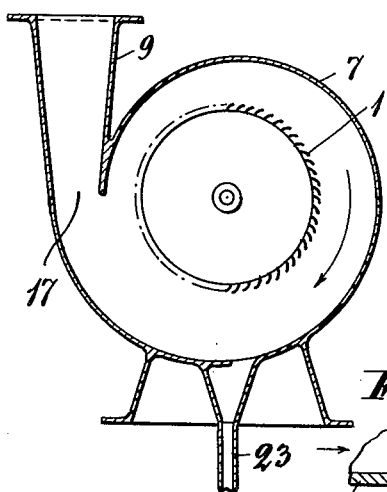
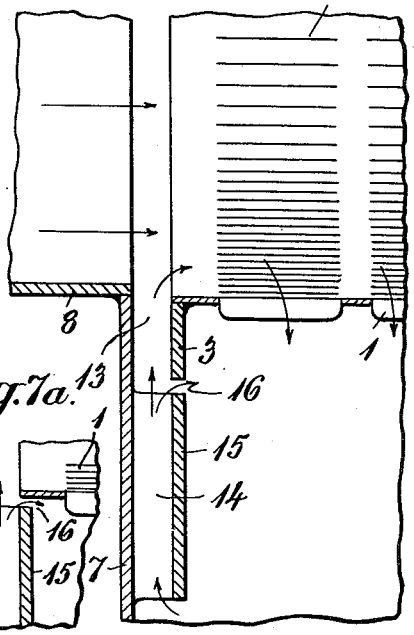
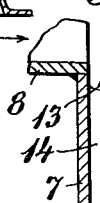
INVENTOR
TORSTEN BLOMÉN
BY [signature]
ATTORNEY May 27, 1952　　　T. BLOMÉN　　　2,598,032
WET SEPARATOR FOR PURIFYING A PARTICLE LADEN GAS CURRENT
Filed June 22, 1949　　　　　　　　　3 Sheets-Sheet 3
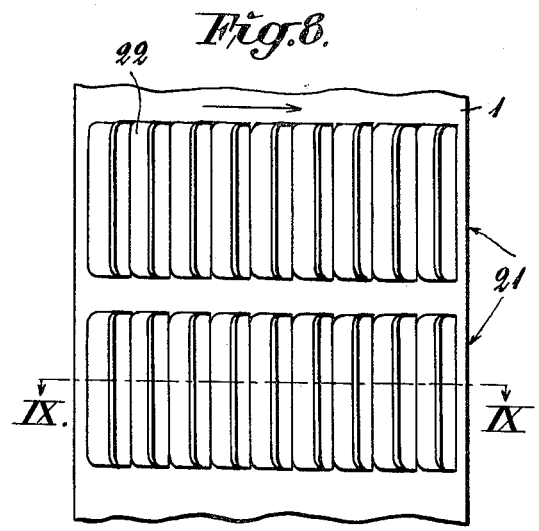
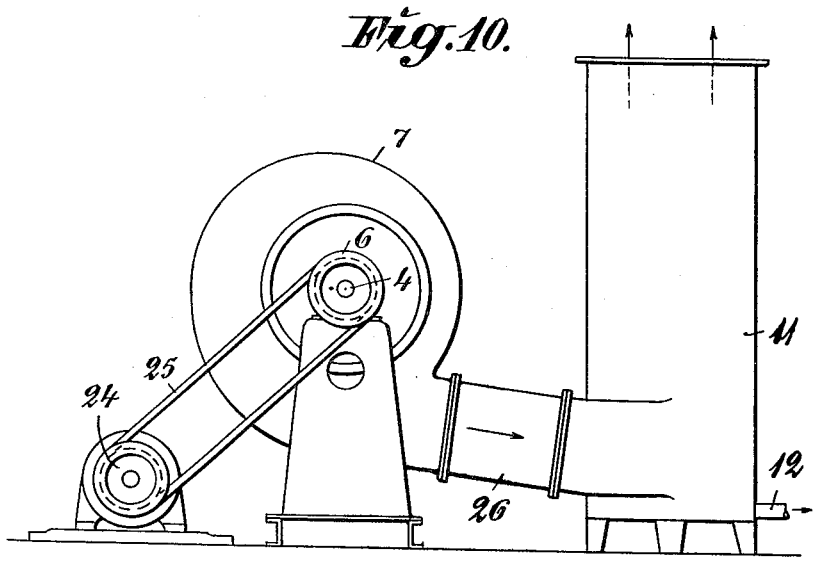
INVENTOR
TORSTEN BLOMÉN
BY
ATTORNEY Patented May 27, 1952

2,598,032

UNITED STATES PATENT OFFICE 2,598,032

WET SEPARATOR FOR PURIFYING A PARTICLE LADEN GAS CURRENT

Torsten Blomén, Stockholm, Sweden, assignor to Aktiebolaget Linderoths Patenter, Stockholm, Sweden Application June 22, 1949, Serial No. 100,669

8 Claims. (Cl. 261—90)

1

This invention relates to wet separators for purifying a particle laden gas current, particularly to wet separators in which a rotor drum having a perforated washing wall is rotated within a housing and a particle laden gas current is fed into the drum in axial direction, the washing wall being continuously wetted. The gas, by the effect of the centrifugal force, passes through the wet washing wall, thereby being liberated of particles, and is then discharged from the housing.

The term "gas," as herein sometimes used, is intended to refer to and to include gaseous fluids of any suitable type; and the particles, mentioned herein, may be dust particles or any other solid particles.

With wet separators of the general type, above referred to, it is generally impractical for various reasons to provide a tight seal between the rotor, the housing and the duct for feeding gas into the rotor. As a result, certain difficulties arise. The washing surface of the rotor drum offers a substantially frictional resistance to the gas current so that the static pressure within the housing at or close to the outside of the washing wall is lower than within the interior of the rotor drum. Consequently, part of the particle laden gas may flow directly from the feed duct into the housing and, hence, is not purified, thereby reducing the efficiency of the separator.

One of the objects of the invention is to provide a novel and improved wet separator of the general type, above referred to, which has a high separation efficiency.

Another object of the invention is to provide a novel and improved wet separator of the general type, above referred to, which includes means to prevent the escape of an appreciable quantity of non-purified gas into the discharge duct, thereby increasing the separation efficiency of the separator.

Another more specific object of the invention is to provide means by which the effect of the aforementioned drop in static pressure is substantially eliminated, thereby preventing or at least substantially reducing the escape of non-purified gas.

Another object of the invention, allied with the preceding one, is to provide in the gap between the rotor drum, the housing and the feed duct obstacles and guides so designed that they tend to counteract and off-set the aforementioned pressure drop.

Other and further objects, features and advantages of the invention will be pointed out hereinafter and set forth in the appended claims forming part of the application.

In the accompanying drawings, several now preferred embodiments of the invention are shown by way of illustration and not by way of limitation.

2

In the drawing:

Fig. 1 is an elevational sectional view of a wet separator according to the invention taken on line I—I of Fig. 2.

Fig. 2 is a sectional plan view taken on line II—II of Fig. 1.

Fig. 3 is a fragmentary view of Fig. 2 on an enlarged scale.

Fig. 4 is an elevational sectional view of a modification of a wet separator according to the invention taken on line IV—IV of Fig. 6.

Fig. 5 is a sectional view taken on line V—V of Fig. 4.

Fig. 6 is a sectional view taken on line VI—VI of Fig. 4.

Fig. 7 is a fragmentary view of Fig. 4 on an enlarged scale.

Fig. 7a is a fragmentary view similar to Fig. 7, showing a modification of Fig. 7.

Figs. 8 and 9 are a fragmentary plan and sectional view respectively, of the washing wall of the rotor drum on an enlarged scale, and Fig. 10 is an elevational side view of another modification of a wet separator according to the invention.

Referring now more in detail to the embodiment of the invention, as shown in Figs. 1, 2 and 3, the wet separator according to these figures comprises a drum rotor having a cylindrical wall 1 and a side wall 2, the drum wall opposite to wall 2 being entirely or substantially entirely open. Cylindrical wall 1 includes a louvered washing area generally designated by 21. This washing area may be formed by a plurality of preferably curved tongues 22 bent out of the wall material proper. As can best be seen on Figs. 8 and 9, the slots extend parallel to the drum axis and are parallel to each other in circumferential direction. The circumferential spacing of the slots is preferably so selected that adjacent slots are separated by only the strength of the wall material. The angle and length of the tongues may be so selected that the trailing edge of each tongue is short of the leading edge of the next succeeding tongue, as seen in the direction of rotation (see arrows).

The rotor drum is supported by a shaft 4 journalled in bearings 5. Shaft 4 may be rotated by any suitable drive means, for instance by means of a pulley 6. The rotor is disposed within a substantially spiral shaped housing 7 which is provided with an inlet duct 8 for the gas current to be purified, for instance dust laden air, and an outlet duct 9 for the purified gas. Inlet 8 communicates with the interior of the drum in axial direction and is in alignment with the aforementioned open side wall of the drum. Outlet 9 preferably communicates tangentially with housing 7. A spraying device 10 serves to wet continuously the rotating wall 1.

The particle laden air fed into the drum is forced during operation by the centrifugal force through washing wall 1. As a result, the dust particles will be retained in the liquid film covering the wall. The air, thus purified after passage through the wall, flows through the spiral housing and is discharged through outlet 9. The liquid together with the collected dust is also thrown by the centrifugal force through the wall 1 and into the spiral housing 7. The liquid may be collected at the bottom of the housing and discharged through a pipe 23.

As previously mentioned, the louvered washing wall offers a considerable resistance to the air current. As a result, the static pressure within housing 7 close to the outside of the drum is lower than within the interior of the drum. Consequently, dust laden air fed through inlet 8 will tend to flow through the gap between the open side wall of the drum and the adjacent housing wall directly into the housing, that is, without passing through the washing wall and, hence, without being purified.

For the purpose of preventing such escape of non-purified air a guide member 3 and baffle plates 14 are provided in accordance with the invention.

The guide member is shown as a ring flange fastened to washing wall 1 for rotation in unison with the drum rotor. Flange 3 extends radially from the drum parallel to the housing wall having the gas inlet therethrough to form a comparatively narrow slot 13. The radial length of the flange is so selected that slot 13 issues in a zone of housing 7 in which the static pressure is higher than in the interior of the drum.

While the provision of slot 13 tends to counteract the escape of non-purified air directly into the housing, the effect of the slot alone is not sufficient to attain the principal object of the invention in a satisfactory manner. As will be evident, the rotation of the rotor will cause a rotation of the mass of air within slot 13. If now this mass of air rotates with approximately the same velocity as the mass of air that is in spiral housing 7 at the same radial distance from shaft 4 as is the mass of air in slot 13, the centrifugal forces of the masses of air flowing within slot 13 and within the housing would balance each other. Consequently, slot 13 alone cannot prevent a direct flow of air from inlet 8 into the housing. To prevent effectively such escape of non-purified air, a rotation of the mass of air in slot 13 must be impeded so that this mass of air forms a block or obstacle. For the purpose of preventing a rotation of air in slot 13, a plurality of stationarily, radially spaced baffle plates 14 are provided. Baffles 14 are shown as secured to the respective housing wall but can also be stationarily mounted in any other suitable manner.

As will be evident, baffles 14 will block or at least impede a revolving flow of air in slot 13.

Practical tests have shown that in the zone 17 in which outlet 9 communicates with the housing a rather steep drop in the static pressure may occur by reason of the acceleration of the air current when entering outlet 9. Such drop of pressure is particularly marked when a large volume of air is passed through the filter. As a result of such steep drop in pressure, the pressure in zone 17 may become lower than the pressure in a zone of housing 7 which is at the same radial distance from shaft 4 as is zone 17. In certain instances the pressure in zone 17 may even be lower than in the interior of the rotor. To prevent in this critical zone an overflow of non-purified air into outlet 9, a shield 18 is provided which shields the respective portion of the outer open circumference of slot 13 against housing 7. Shield 18 is shown as a plate member secured to the housing and extending parallel to ring flange 3 to form a radial slot or space 20 with the ring flange and the housing and an axial slot 19 with washing wall 1. The shielding effect of plate 18 can be further increased by selecting the space 20 between the shield plate and the housing considerably larger than the slot 19. As a result of such an arrangement, the static pressure in space or slot 20 will be higher than in the rotor whereby an overflow of non-purified air into the zone 17 is effectively prevented.

In certain instances it is advantageous to extend slot 13 in radial direction. Figs. 4 to 7 show such an arrangement. As can best be seen on Fig. 7, the second ring flange 15 is provided in radial alignment with ring flange 3. Flange 15 is stationarily mounted, for instance by securing the flange to baffles 14. This has the advantage that the radial extension of flange 3 can be reduced which is desirable in practice. As will be noted, flanges 15 and 3 are separated by a gap 16. The width radial of gap 16 should be considerably narrower than the width of slot 13 since otherwise so much air can flow from slot 13 into housing 7 through gap 16 that the static pressure in slot 13 becomes lower than in the rotor which must be avoided, as previously explained.

For certain applications it is possible and also quite practical to omit ring flange 3 entirely. Fig. 7a shows such an arrangement. As will be noted, ring flange 15 then forms the gap 16 with washing wall 1. This gap should again be considerably narrower than slot 13.

Fig. 10 shows a wet separator the interior design of which is similar to either one of the designs previously described. Pulley 6 of shaft 4 is rotated by means of a motor 24 and a belt 25. The difference between the previously described separators and the separator according to Fig. 10 resides in the discharge of the purified air and the particle laden liquid from housing 7. According to Fig. 10, the purified air and the particle laden liquid are delivered through a duct 26 to a precipitator 11 of conventional design. In this precipitator the liquid and the air are separated. The air is discharged at the top of the precipitator, as indicated by the arrows, and the liquid flows off through a pipe 12.

While the invention has been described in detail with respect to certain now preferred examples and embodiments of the invention it will be understood by those skilled in the art after understanding the invention, that various changes and modifications may be made without departing from the spirit and scope of the invention and it is intended, therefore, to cover all such changes and modifications in the appended claims.

What is claimed as new and desired to be secured by Letters Patent is:

1. A wet separator for purifying a particle laden gas current of the type comprising a housing, a drum rotor mounted freely rotatable within the housing, the cylindrical wall of said drum including a perforated washing area and at least one of the side walls of the drum including an inlet opening, the housing wall facing said drum inlet including an inlet opening aligned with the drum inlet, conduit means communicating with said housing inlet for feeding particle laden gas into the interior of the drum substantially in the direction of the drum axis, and conduit means for discharging the purified gas from the housing, in combination with a guide member within the housing encompassing the drum and extending a substantial distance radially to the drum axis beyond the circumference of the drum and into a zone of the housing in which the operational gas pressure is higher than within the drum, said guide member being positioned to form with the housing wall having said inlet a narrow radial slot leading from said inlets into the housing, and a plurality of stationarily mounted baffle plates disposed within said slot spaced apart and radially to the rotor axis for impeding a rotating flow of gas within said slot.

2. A wet separator as described in claim 1, wherein said guide member comprises an annular flange radially extending into a zone in the housing in which the operational static pressure is higher than in the interior of the drum.

3. A wet separator as described in claim 1, wherein said guide member comprises a ring flange secured to the drum for rotation in unison therewith and radially extending therefrom into the surrounding housing space.

4. A wet separator as described in claim 1, wherein said guide member comprises an annular flange stationarily mounted within the housing and separated by a gap from the washing wall of the drum, the radial width of said axial slot being narrower than the width of said radial slot.

5. A wet separator as described in claim 1, wherein said guide member comprises an annular flange element secured to the drum for rotation in unison therewith and radially extending therefrom, and a second annular flange element stationarily mounted within the housing and extending in radial alignment with the rotatable flange element, said two flange elements being separated by a gap, the radial width of said gap being narrower than the width of said radial slot.

6. A wet separator as described in claim 1, in combination with a shield member stationarily mounted within the housing and positioned to shield the portion of the open circumference of said radial slot adjacent to said discharge conduit means for preventing a direct flow of particle laden gas into the housing space surrounding the drum.

7. A wet separator as described in claim 1, wherein said housing is spiral shaped, and wherein said discharge means are disposed to communicate tangentially with the widest portion of the spiral shaped housing.

8. A wet separator as described in claim 1, wherein the said discharge conduit means are arranged to communicate substantially tangentially with said housing, and wherein a shield member is stationarily mounted within the housing parallel to said guide member so as to form a radial slot with said guide member and a gap with the washing wall of the drum, the said radial slot being wider than the said gap, said shield member being positioned in the housing so as to shield the open circumference portion of the radial slot between the guide member and the respective housing wall adjacent to the discharge conduit means for preventing a direct flow of particle laden gas into the housing space surrounding the drum.

TORSTEN BLOMÉN.

REFERENCES CITED

The following references are of record in the file of this patent:

UNITED STATES PATENTS

| Number | Name | Date |
| --- | --- | --- |
| 1,875,711 | Dudley | Sept. 6, 1932 |
| 1,949,429 | McGee | Mar. 6, 1934 |
| 1,978,007 | Anthony, Jr. | Oct. 23, 1934 |
| 2,220,657 | Placek | Nov. 5, 1940 |

FOREIGN PATENTS

| Number | Country | Date |
| --- | --- | --- |
| 72,761 | Norway | Nov. 3, 1947 |